(12) United States Patent
Hough

(10) Patent No.: US 6,189,743 B1
(45) Date of Patent: Feb. 20, 2001

(54) FLUID DISPENSING DEVICE FOR OVERHEAD PLANTS

(75) Inventor: Harold Hough, Brooklin (CA)

(73) Assignee: Hy-Plant Watering Systems Inc., Pickering (*) Notice: Under 35 U.S.C. 154(b), the term of this patent shall be extended for 0 days.

(21) Appl. No.: 09/252,422

(22) Filed: Feb. 18, 1999

(51) Int. Cl.⁷ .................................................. B67D 5/42
(52) U.S. Cl. ................................................. 222/386
(58) Field of Search .................................... 272/158, 386, 272/174; 169/33; 239/331, 320

(56) References Cited

U.S. PATENT DOCUMENTS

| | | |
|---|---|---|
| 216,808 | 6/1879 | Schrader . |
| 299,096 | 5/1884 | Winter . |
| 631,115 | 8/1899 | Hutchings . |
| 635,961 * | 10/1899 | Hasson ................................. 222/386 |
| 815,192 | 3/1906 | Mercer et al. . |
| 1,403,140 * | 1/1922 | Wiggins ................................ 239/331 |
| 1,407,689 | 2/1922 | Batterson . |
| 1,984,340 | 12/1934 | Goulard et al. . |
| 3,670,966 | 6/1972 | Korda . |
| 4,344,577 | 8/1982 | Gilson et al. . |
| 4,688,643 | 8/1987 | Carter et al. . |
| 4,955,545 * | 9/1990 | Stern et al. ........................... 239/320 |
| 5,287,994 | 2/1994 | Dempsey . |
| 5,882,691 | 3/1999 | Conboy . |

FOREIGN PATENT DOCUMENTS

| | | |
|---|---|---|
| 43 41 182 | 6/1995 | (DE) . |
| 0 182 667 | 5/1986 | (EP) . |
| 13567 * | 7/1895 | (GB) ..................................... 222/386 |
| 558197 * | 6/1942 | (GB) ..................................... 239/320 |
| 2279553 | 1/1995 | (GB) . |
| 2284022 | 5/1995 | (GB) . |
| 2321171 | 7/1998 | (GB) . |

* cited by examiner

Primary Examiner—Philippe Derakshani
(74) Attorney, Agent, or Firm—Eugene J. A. Gierczak

(57) ABSTRACT

A fluid dispensing device for dispensing fluid on overhead plants comprising a container and plunger. A process for dispensing fluid onto overhead plants using a fluid dispensing device comprising a container and plunger.

27 Claims, 7 Drawing Sheets

FLUID DISPENSING DEVICE FOR OVERHEAD PLANTS

FIELD OF INVENTION

This invention relates generally to method and apparatus for dispensing fluid on overhead plants.

BACKGROUND OF INVENTION

For aesthetic as well as air quality related health reasons, a typical office or residential environment generally includes a large number of plants. Maintenance of such plants generally includes dispensing fluids on such plants regularly, including water, and liquid fertilizers, insecticides and herbicides, as well as admixtures of the same.

Plants are often placed out of the reach of a person of ordinary height. For example, containers for plants are often suspended from the ceiling or placed on the top of bookshelves or the like. Currently individuals responsible for maintaining such plants use a ladder or chair to remove such plants from their elevated position for maintenance, or alternatively use a ladder or chair to reach the plants and dispense water, and liquid fertilizers, herbicides or insecticides directly onto the plant using some form of dispenser such as a watering can. Dispensing these liquids in this fashion is not only cumbersome but also constitutes a safety hazard as there is a risk that the individuals maintaining the plants in this way might injure themselves while mounting and dismounting the ladder or pedestal. Particularly where a large number of plants need to be maintained, the risk of injury is not negligible. The risk of injury is still greater where the individuals maintaining the plants are of an agility that is less than average due to advanced age or infirmity. Furthermore, there is a risk of spillage onto the floor when dispensing liquids on overhead plants.

Various devices are known for dispensing liquids required for maintenance of plants. None, however, are known which disclose means for addressing the aforenoted problem. There is a need therefore for a fluid dispensing device particularly for use with respect to overhead plants. There is a further need for such a fluid dispensing device which is inexpensive to manufacture and easy to operate.

Numerous devices are known for dispensing liquids required for the maintenance of plants. For example, U.S. Pat. No. 216,808 issued to A. Schrader on Jun. 24, 1879 relates to a plant sprinkler in which a rose sprinkler is combined with a bulb, a flexible tube, and coupling valves, and in which a loose collar at the lower coupling valve is provided with a hook for suspending a small pail containing the water or other liquid with which the plant is to be sprinkled, so that said pail will be suspended in its proper position to the sprinkler, and can be moved from place to place and introduced among plants while the watering progresses.

U.S. Pat. No. 697,572 issued to Fred C. Hutchings on Aug. 15, 1899 relates to a sprayer whereby insect-destroying liquid may be thrown or sprayed in considerable quantities from a tank which comprises a pole having a delivery pipe, tank attached to one end of said pole, and force pump associated with said pole and tank.

U.S. Pat. No. 1,407,689 issued to Clyde A. Batterson on Feb. 28, 1992 relates to an implement for destroying weeds which includes not only means for cutting the root of a weed, but also means for forcibly ejecting a measured quantity of poisonous liquid into said root. Said implement includes a barrel adapted to hold liquid; disk at the lower end of the barrel and partly closing said end; nozzle member enclosing said disk and said barrel, and holding the disk in position, said disk having a central aperture, a rod reciprocable within the barrel and having a valve fast thereto, said valve being seated on the lower face of the disk when the rod is pulled upwardly; bore provide in the nozzle section and furnishing a second valve seat opposing the disk; counterbore or reduced diameter leading off from the bore; second counterbore leading off from the first counterbore and being of less diameter than the first counterbore; and discharge vent connected with the lower end of the second counterbore, said rod having an extension beyond the valve, said extension being reciprocable within the discharge vent.

U.S. Pat. No. 1,984,340 issued to Alexander Goulard and Harold G. Olena on Dec. 11, 1934 relates to an improved hand operable spray pump comprising a container for holding a quantity of liquid to be sprayed by the pump; means for attaching the pump to said container; wire support pivotally secured to the handle end of the pump cylinder, said support being of a height determined by the height of the container to which the pump is attached so that it, together with the container, forms means for maintaining the pump in a substantial horizontal position when placed on a level surface; and said support being foldable against the pump cylinder when the pump is in use.

U.S. Pat. No. 5,287,994 issued on Feb. 22, 1994 to James R. Dempsey relates to a selective liquid distribution device comprising an elongated reservoir tube member, including a top and bottom end and internal reservoir extending along the length thereof; at least a portion of the elongated reservoir tube members associated with the transparent portion of the reservoir tube, including volume identification markings for indicating a liquid volume within the reservoir tube by visual alignment of the meniscus of a column of liquid in the reservoir tube with said identification markings; dispenser valve means on the bottom end of the tube, normally closed to retain liquid within the reservoir tube member selectively opening responsive to axial force applied thereto in a direction toward the top end of the tube to permit dispensing of liquid from within the elongated reservoir tube member; filler means on the elongated reservoir and; and vent adjacent the top end of the tube and opening the internal reservoir to the surrounding atmosphere to facilitate free drainage of liquid from the reservoir responsive to opening of the dispenser valve means.

Finally, others have utilized a hose reel waterer which comprises a coiled hose that can be attached at one end to a faucet and has at the other end a hollow wand for watering plants.

SUMMARY OF THE INVENTION

One aspect of the present invention is to provide a fluid dispensing device for overhead plants.

In accordance with another aspect of the invention, there is provided a fluid dispensing device comprising a container for holding a fluid having a first end and second end opposite to the first end, and plunger operably associated with said container. Said container further comprises an outlet for dispensing said fluid disposed at said first end of said container; and a deflecting surface disposed adjacent to said outlet. The plunger is operable to introduce said fluid into said container and dispense said fluid from said container over said deflecting surface and through said outlet.

In accordance with still another aspect of the invention, a fluid dispensing device for overhead plants is disclosed comprising a hollow cylinder having an inner surface, a first end and a second end opposite to said first end, and plunger associated with said hollow cylinder. Said hollow cylinder further includes an outlet for dispensing said fluid at said first end of said hollow cylinder and curved nozzle disposed adjacent to said outlet. Said plunger further comprises a rod; piston attached to said rod, said piston having an outer surface, and said rod and piston being slidably mounted within said hollow cylinder; manually operable sliding means; and sealing means associated with said manually operable sliding means to substantially reduce introduction or evacuation of air or water from said hollow cylinder other than from said outlet when said fluid dispensing device is in use. Said outer surface of said piston frictionally engages said inner surface of said hollow cylinder when said rod and piston are slidably moved within said hollow cylinder. Said rod and piston are moveable in a first direction for introducing said fluid into said hollow cylinder, and in a second direction for dispensing said fluid from said hollow cylinder to said outlet with said curved surface guiding said fluid from said outlet to said overhead plants.

In accordance with a further aspect of the invention, a process for watering an overhead plant, which comprises the steps of introducing fluid into a fluid dispensing device having a container with opposed first and second ends, by slidably moving a plunger within the container towards said first end where the plunger is slidably mounted within said container, and said container further comprises an outlet and curved nozzle adjacent to said outlet; and then dispensing said fluid onto said overhead plant by pointing said curved nozzle toward said overhead plant and moving said plunger toward said second end and dispensing said fluid to the outlet with the curved nozzle guiding the fluid from the outlet to the overhead plants.

BRIEF DESCRIPTION OF DRAWINGS

A detailed description of the preferred embodiments are provided herein below, by way of example only, with reference to the following drawings, in which.

Figures 1A, 1B:
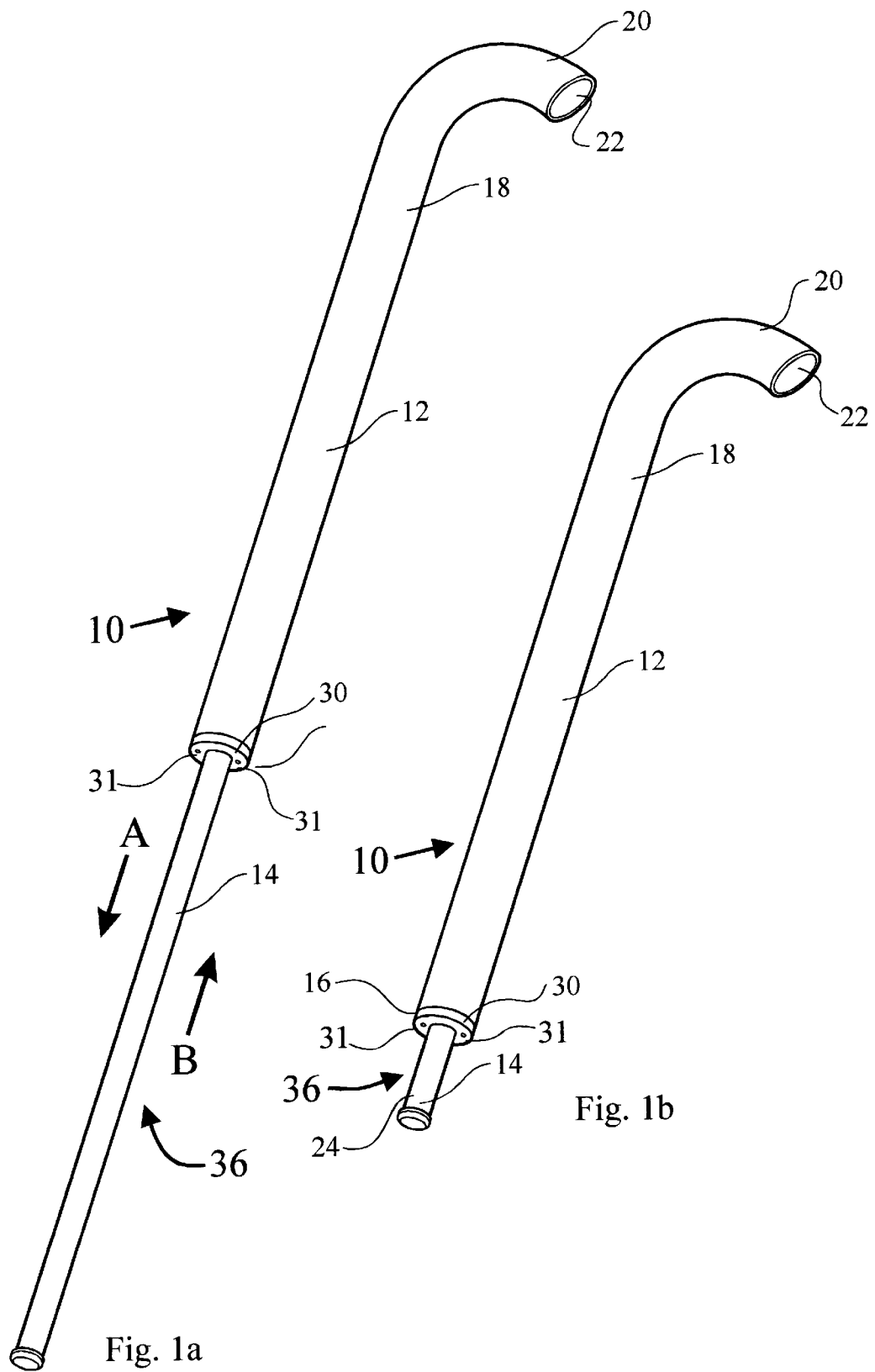
FIG. 1a is a perspective view of a first preferred embodiment of the fluid dispensing device wherein the plunger is in a first position.
FIG. 1b is a perspective view of the first preferred embodiment of the fluid dispensing device wherein the plunger is in a second position.

In the drawings, preferred embodiments of the invention are illustrated by way of example. It is to be expressly understood that the description and drawings are only for the purpose of illustration and as an aid to understanding and are not intended as a definition of the limits of the invention.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Referring to FIGS. 1a and 1b there is illustrated a preferred embodiment of the fluid dispensing device 10 comprising a container 12 and plunger 14. Said container 12 further comprises a first end 16, fluid containing portion 18, curved nozzle 20 disposed adjacent to said fluid containing portion 18 and outlet 22.

Figure 2:
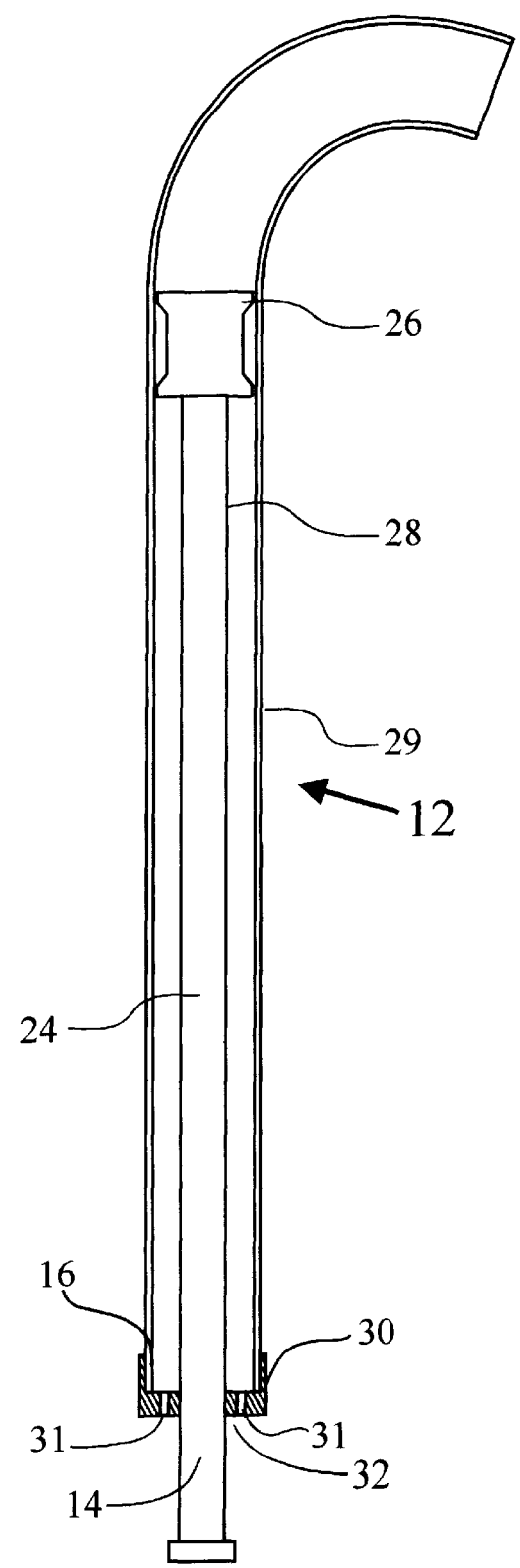
FIG. 2 is a cross-sectional view of the first preferred embodiment of the fluid dispensing device.
Figure 3:
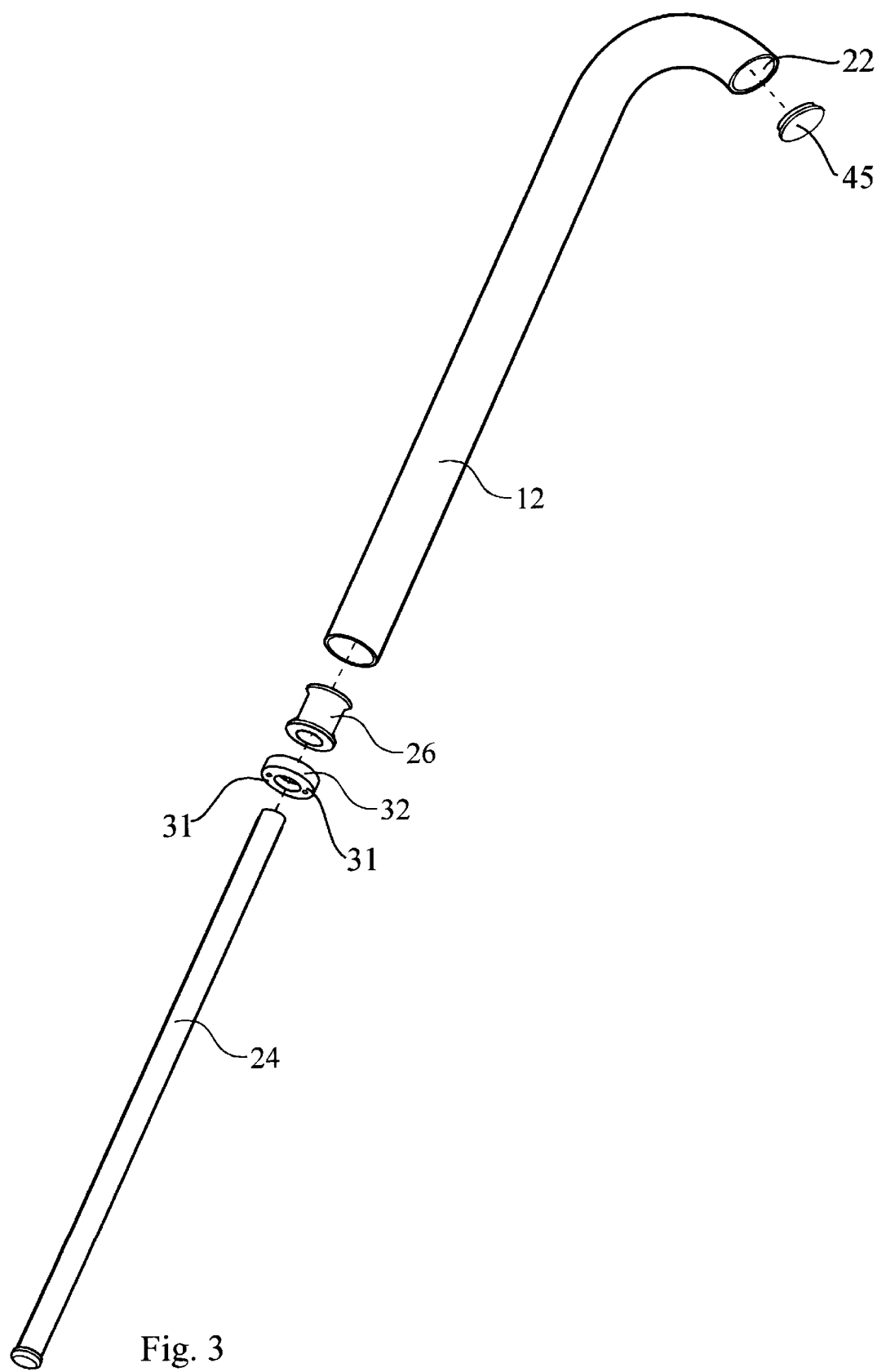
FIG. 3 is an exploded view of the first preferred embodiment of the fluid dispensing device.

As best shown in FIGS. 2 and 3, said container 12 comprises a first end 16, and said plunger 14 further comprises a rod 24 and piston 26 mounted on one extremity of said rod 24. Said rod 24 has a diameter and outer surface 28. Said fluid dispensing device 10 further comprises an end cap 30 which is mounted on said first end 16 of said container.

In the preferred embodiment of the invention described herein, said end cap 30 has an inner diameter which is marginally less than the outer diameter of said first end 16 and said end cap 30 comprises a flexible resilient material, whereby said end cap 30 is friction fitted on the outer surface of said container 12 adjacent to said first end 16. Alternatively, in another preferred embodiment of the invention described herein, said end cap 30 comprises a rigid plastic material and further comprises a side wall which is threaded wherein said side wall engages threads presented by the exterior surface of said container 12 adjacent to said first end 16.

Said end cap 30 presents an orifice 32 for slidably receiving said rod 24. As shown in FIG. 2, the inner diameter of said orifice 32 is marginally lesser than said diameter of said rod 24, and therefore said orifice 32 frictionally engages said outer surface 28 of said rod.

As best shown in FIG. 1a, said rod 24 and piston 26 are moveable in a first direction A wherein said rod 24 is in a first position wherein said rod 24 is substantially outside of said container 12, and a second direction B wherein said rod 24 is in a second position wherein said rod 24 is substantially disposed within said container 12, as best shown in FIG. 1b.

As best illustrated in FIG. 2, the piston 26 preferably comprises a flexible resilient material and further comprises an outer diameter. Said container 12 further comprises an inner diameter 29 which is marginally lesser than said outer diameter of said piston 26. In addition, the diameter of said rod 24 is less than the diameter of said container 12. Accordingly, and further by means of said rod 24 being received by said end cap 30, said rod 24 and piston 26 are slidably mounted within said container 12.

The fluid dispensing device further comprises a sliding means for moving said rod and piston within said container 12. In the preferred embodiment illustrated in FIG. 1b, said sliding means 36 is presented by a portion of said rod 24 that protrudes from said end cap 30 even when said rod 24 and piston has been moved fully in said second direction B. The sliding means 36 is presented in association with said curved nozzle 20 which obstructs further movement of said rod 24 and piston in said second direction beyond a desired point which defines the length of said sliding means 36. In other words, the curvature of the nozzle prevents the rod 14 from moving further in direction B. Alternative means for blocking further movement of said rod and piston in said second direction could include a blocking disk (not shown) disposed in said container 12 at a desired point which defines the length of said sliding means, said blocking disk having a surface with one or more orifices which allows the passage of air and water in and out of said container 12 but blocks passage of said rod in said second direction.

Operation of the fluid dispensing device 10 described herein requires creation of a vacuum in said container 12. This vacuum is presented by said inner diameter 29 of said container 12 being marginally lesser than said outer diameter 27 of said piston 26 which prevents air from escaping said container 12 other than out of said outlet 22. End cap 30 further contributes to this vacuum by preventing the escape of air from said container when said fluid dispensing device 10 is in use although end cap 30 will permit the escape of air between the piston 26 and end cap 30 to escape through the seal between the orifice 32 and rod 14 when moving the rod in direction A. In the preferred embodiments illustrated herein, however, said end cap 32 further presents a pair of aeration holes 31 for allowing air to exit said container 12 when the sliding means is moved in direction A, as best shown in FIG. 1a. Said aeration holes are sized to allow air to exit container 12 without allowing fluid to exit container 12, in a manner well-known to those skilled in the art.

Figure 4:
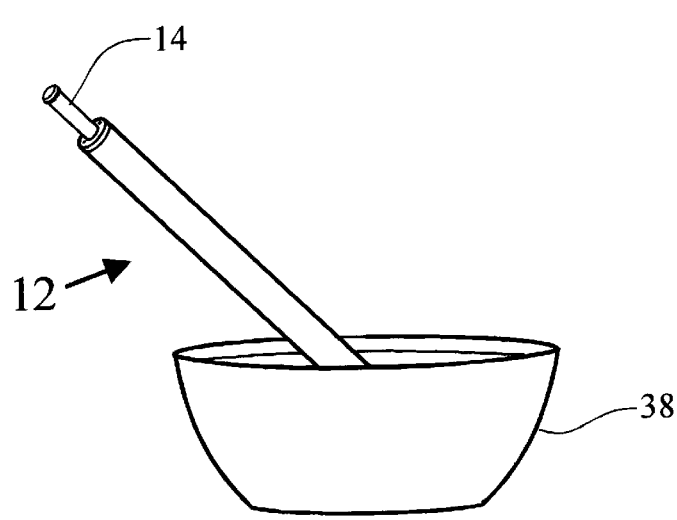
FIG. 4 is a front view of the first preferred embodiment of the fluid dispensing device wherein water is being introduced into the device from a bucket.

In operation, as best shown in FIG. 4, fluid is introduced into said container 12 by first moving said plunger 14 in said second direction B whereby air is forced from said container 12 by said plunger 14 thereby creating a vacuum inside said container 12. Accordingly, when said outlet 22 is brought into contact with a fluid stored in a container such as a bucket 38, said fluid is introduced into said container 12. Alternatively, said container can be filled by pouring water into said outlet 22 from a tap.

Figure 5:
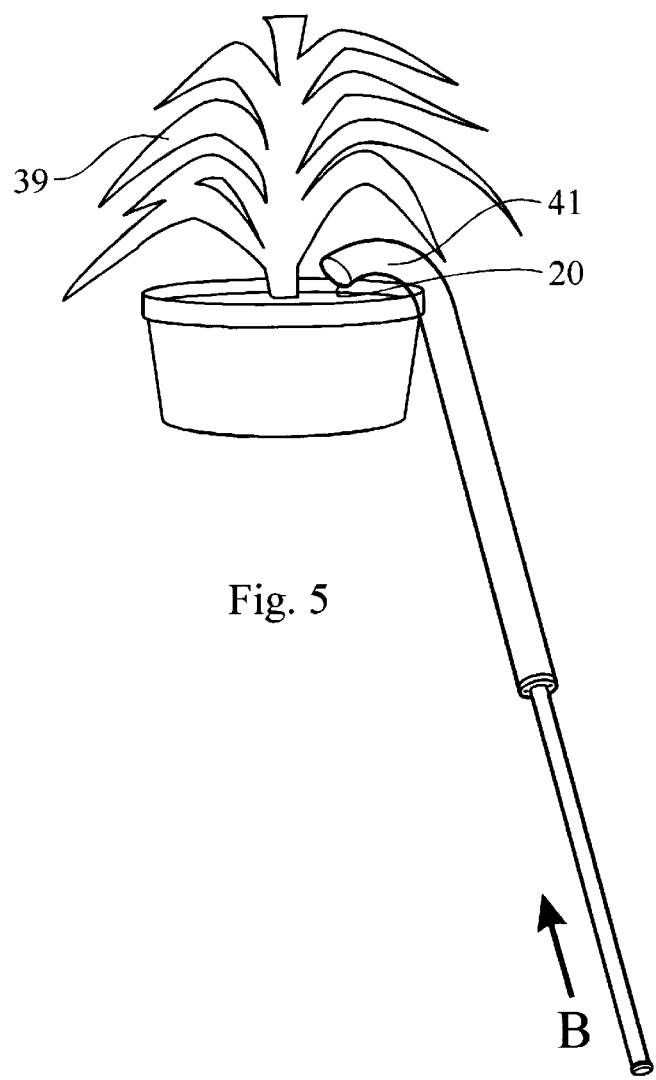
FIG. 5 is a front elevational view of the fluid dispensing device wherein a fluid is being dispensed onto an overhead plant.

As best shown in FIG. 5, said container is elevated by the user of the fluid dispensing device toward an overhead plant 39, and said curved nozzle 20 is pointed downwardly over said overhead plant 39 and said plunger 14 is moved in said direction B and said fluid is then deflected by the interior surface of said curved nozzle 20 to evacuate said fluid downwardly through said outlet 22 and on to said overhead plant 39.

Alternate means for evacuating said fluid downwardly through said outlet 22 other than said curved nozzle 20 could include, for example, a deflecting wall mounted inside said container having a surface which is substantially the same as the cross-section of said container, wherein said deflecting wall deflects said fluid in the direction of an outlet disposed in the outer wall of said container.

The fluid dispensing device described herein could be further provided with a pointing means consisting, for example, of markings presented by the outer surface of said container opposite to said outlet 22 for ensuring that said fluid dispensing device is oriented so that said outlet 22 is pointing downwardly in relation to an overhead plant.

The fluid dispensing device described herein could also include an outlet sealing cap 45, as shown in FIG. 3, for sealing outlet 22 to avoid spillage of fluid from said container 12 when the fluid dispensing device is being transported, or the user of the fluid dispensing device is interrupted in operation, for example, by a telephone call.

Said container 12 is adaptable to present various means for measuring the volume of fluid disposed in said container 12 and, hence, presenting means for dispensing a desired volume of fluid on a plant. By way of example, such a volume indicator could be presented by said container 12 comprising a transparent material and bearing markings on the outer surface of said container 12 to track, in combination with said transparent container, the volume of said fluid. Alternatively, volume markings could be placed on said rod 24, in a manner well-known to those skilled in the art. As a further alternative, digital output means could be associated with water sensors disposed on the inner surface of the container 12, or position sensors associated with said rod 24, in a manner well-known to those skilled in the art.

Figure 6:
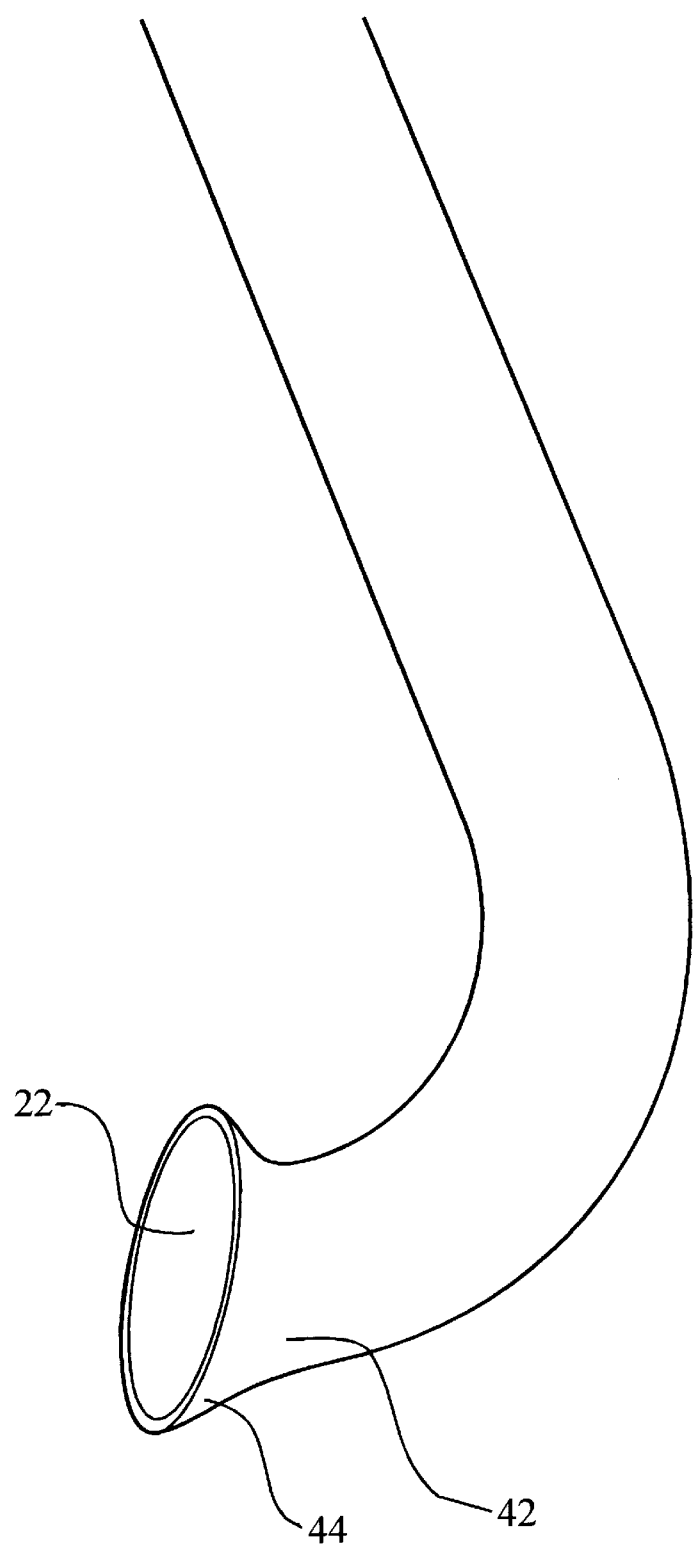
FIG. 6 is a partial perspective view of a second alternate embodiment of the fluid dispensing device.

The invention disclosed herein further provides means for preventing fluid from splashing back on to the user of the fluid dispensing device in operation by deflecting outwardly the fluid as it is forced from the fluid dispensing device. In a second preferred embodiment of the invention disclosed herein illustrated in FIG. 6, the fluid dispensing device further comprises a splash guard 42 presented by a trumpet member disposed adjacent to said outlet 22, said trumpet member 42 having a modified outlet end 44 which projects outwardly thereby dispersing fluid as it exits from said container.

Figure 7:
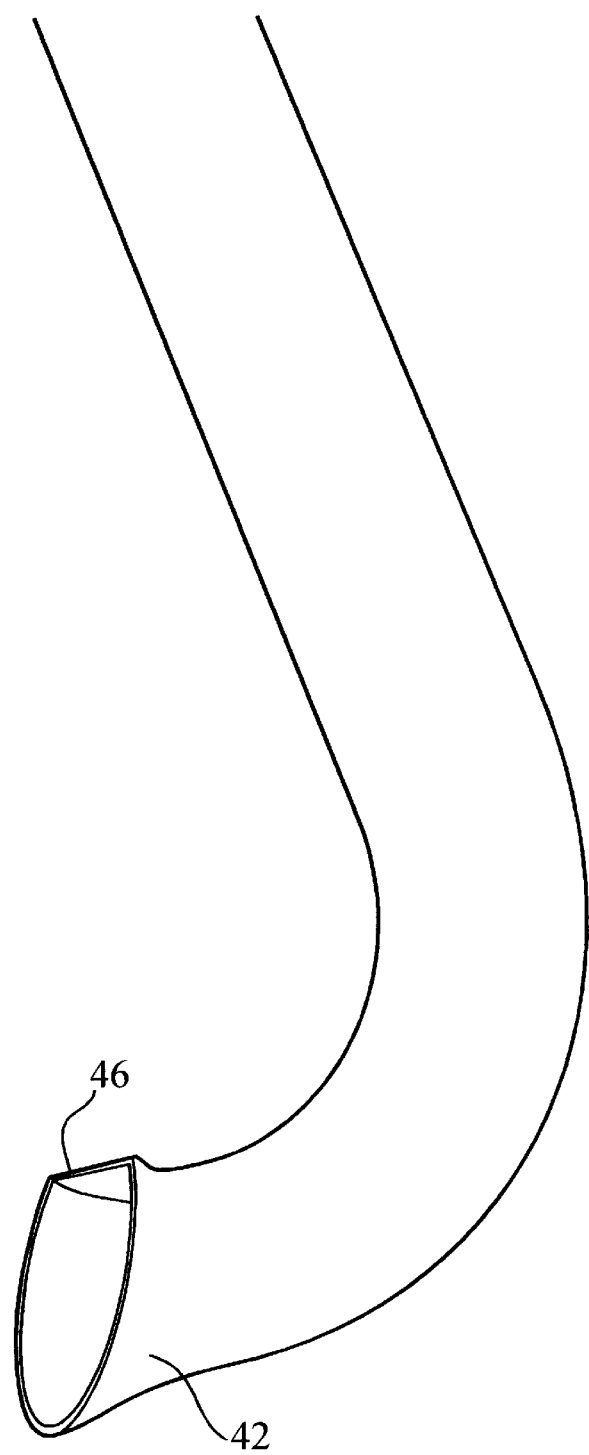
FIG. 7 is a partial perspective view of a third alternate embodiment of the dispensing device.

In a third preferred embodiment of the invention disclosed herein shown in FIG. 7, said modified outlet end further includes a straight edge 46 for preventing said modified outlet end from being caught on the top edge of an overhead plant thereby causing the container for an overhead plant to tip and spill water or soil.

Figure 8:
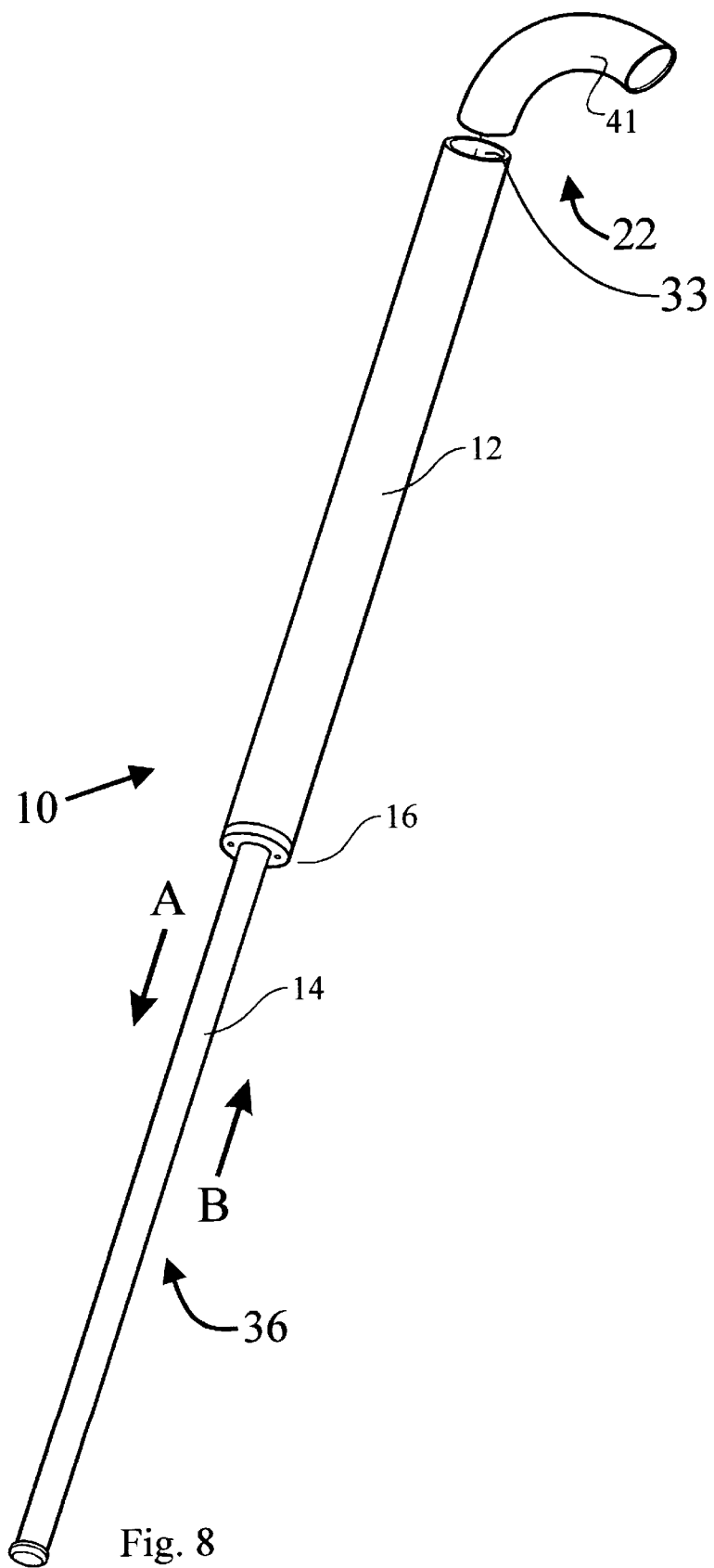
FIG. 8 is a perspective view of a fourth alternate embodiment of the fluid dispensing device wherein an elbow is connected to the hollow cylinder.

In the first, second and third preferred embodiments of the invention disclosed herein said container comprises one single member or two half members glued to one another. In a fourth preferred embodiment illustrated in FIG. 8, said container 12 comprises two parts, namely a cylindrical member and curved member 41. The outer diameter of curved member 41 is slightly larger than the inner diameter of cylindrical member opening 33, therefore in assembling the fluid dispensing device said curved member 41 and cylindrical member are connected by friction fitting said curved member 41 within said cylindrical member opening 33.

Said container 12 could also be adapted to have a cross-section which is other than circular, for example, one that is square, rectangular or triangular, in which case all parts of the fluid dispensing device which correspond in cross-section, namely end cap 30, and piston 26, would also be adapted to have such other cross-section.

By utilizing the device described herein it is not generally necessary for the person doing the watering to stand on any chair or stool to water an overhead plant. Furthermore, the device carries water internally of the hollow cylinder and presents a device having a balanced load as the water is carried uniformly along the length of the hollow cylinder and is not too heavy when lifted overhead to water plants.

Moreover, the device uses a system of fluid displacement rather than pressurization, thereby simplifying the production of the device. By making the device from clear plastic this allows the user a visual check to see how much water is contained in the hollow cylinder.

Also the device may be made from break resistant plastic, which is lightweight so as to be able to be used by the elderly or infirm. Moreover, this device can be hung on a door or hook when not in use.

Various embodiments of the invention have now been described in detail. Since changes in and/or additions to the above-described best mode may be made without departing from the nature, spirit or scope of the invention, the invention is not to be limited to said details.

I claim:
1. A fluid dispensing device comprising;
   (a) a container for holding a fluid having an inner cross-sectional area, said container further comprising:
      (i) a first end and second end opposite to said first end;
      (ii) outlet for dispensing said fluid disposed at said first end of said container; and
      (iii) deflecting surface disposed adjacent to said outlet;
      (iv) fluid containing portion disposed between said second end and deflecting surface; and
   (b) plunger operably associated with said container wherein said inner cross-sectional area of said fluid containing portion is substantially the same as said inner cross-sectional area of said deflecting surface; and wherein said plunger is operable to introduce said fluid into said container and dispense said fluid from said container over deflecting surface and through said outlet.

2. A fluid dispensing device as claimed in claim 1, wherein said inner cross-sectional area of said outlet is substantially the same or greater than said inner cross-sectional area of said deflecting surface.

3. A fluid dispensing device as claimed in claim 2 wherein said deflecting surface comprises a curved nozzle for deflecting the flow of fluid dispensed from said outlet.

4. A fluid dispensing device as claimed in claim 3 wherein said plunger comprises a rod; piston operably associated with said rod wherein said rod and piston are slidably mounted within said container; sliding means for sliding said rod and piston within said container; and sealing means associated with said sliding means to substantially reduce introduction or evacuation of air or water from said container other than from said outlet when said fluid dispensing device is in use.

5. A fluid dispensing device as claimed in claim 4 wherein said piston has an outer surface which frictionally engages said inner cross-sectional area of said container.

6. A fluid dispensing device as claimed in claim 5 wherein said plunger is moveable in a first direction for introducing said fluid into said container, and a second direction for dispensing said fluid from said container.

7. A fluid dispensing device as claimed in claim 4 wherein said sealing means comprises an end cap mounted on said second end of said container, said end cap having an opening adapted to receive said rod, and said opening having an inner surface which is frictionally engaged by said rod when said rod is slidably moved within said container.

8. A fluid dispensing device as claimed in claim 7 wherein said container further comprises a blocking means for blocking said rod and piston when said pump is moved in said second direction; wherein said rod has a first end attached to said piston and a second end opposite to said first end of said rod; and wherein said blocking means, sealing means and rod are operably associated so that said second end of said rod presents means for slidably moving said rod within said container.

9. A fluid dispensing device as claimed in claim 8 wherein said curved nozzle has an inner wall presenting said blocking means.

10. A fluid dispensing device as claimed in claim 4 which further comprises a volume indicator for indicating the volume of said fluid contained in said container.

11. A fluid dispensing device as claimed in claim 10 wherein said container is transparent, said container has an outer surface, and said volume indicator comprises markings indicating volume presented by said outer surface of said container.

12. A fluid dispensing device as claimed in claim 2 wherein said fluid dispensing device further comprises a splash guard.

13. A fluid dispensing device as claimed in claim 12 wherein said splash guard further comprises a sheet of material and mounting means disposed adjacent to said outlet; wherein said mounting means presents means for mounting said sheet of material to said container whereby said sheet projects from said container; and wherein said mounting means and sheet of material present means for preventing splashing of said fluid substantially in said first direction.

14. A fluid dispensing device as claimed in claim 13 wherein said sheet of material of said splash guard has a concave exterior surface at said outlet.

15. A fluid dispensing device as claimed in claim 3, wherein said curved nozzle is flared.

16. A fluid dispensing device as claimed in claim 15, wherein said curved nozzle comprises a straight edge.

17. A fluid dispensing device as claimed in claim 16 which further comprises a volume indicator for indicating the volume of said fluid contained in said container.

18. A fluid dispensing device for overhead plants comprising:
   (a) a hollow cylinder having an inner cross-sectional area and a first end and second end opposite to said first end, said hollow cylinder further comprising:
      (i) outlet for dispensing said fluid at said first end of said hollow cylinder;
      (ii) curved nozzle disposed adjacent to said outlet; and
      (iii) fluid containing portion disposed between said second end and curved nozzle
      wherein the inner cross-sectional area of said fluid containing portion is substantially the same as said inner cross-sectional area of said curved nozzle; and
   (b) plunger associated with said hollow cylinder, said plunger further comprising:
      (i) a rod;
      (ii) piston attached to said rod, said piston having an outer surface, and said rod and piston being slidably mounted within said hollow cylinder;
      (iii) manually operable sliding means for sliding said piston and rod within said hollow cylinder;
      (iv) sealing means associated with said manually operable sliding means to substantially reduce introduction or evacuation of air or water from said hollow cylinder other than from said outlet when said fluid dispensing device is in use; and
   wherein said outer surface of said piston frictionally engages said inner cross-sectional area of said hollow cylinder when said rod and piston are slidably moved within said hollow cylinder; wherein said rod and piston is moveable in a first direction for introducing said fluid into said hollow cylinder, and a second direction for dispensing said fluid from said hollow cylinder to said outlet with said curved nozzle guiding said fluid from said outlet to said overhead plants.

19. A fluid dispensing device as claimed in claim 18, wherein said inner cross-sectional area of said outlet is substantially the same or greater than the inner cross-sectional area of said curved nozzle.

20. A fluid dispensing device as claimed in claim 19, wherein said sealing means comprises an end cap mounted on said second end of said hollow cylinder, said end cap having an opening adapted to receive said rod, said opening having an inner surface which is frictionally engaged by said rod when said rod is slidably moved within said hollow cylinder.

21. A fluid dispensing device as claimed in claim 20 wherein said curved nozzle comprises an inner wall which presents means for blocking said rod and piston when said rod and piston are moved in said second direction; wherein said rod has a first end attached to said piston and a second end opposite to said first end of said rod; wherein said blocking means, sealing means and rod are operably associated so that said second end of said rod presents said manually operable sliding means.

22. A fluid dispensing device as claimed in claim 21 which further comprises a volume indicator for indicating the volume of said fluid contained in said container.

23. A fluid dispensing device as claimed in claim 22 wherein said container is transparent, said container has an outer surface, and said volume indicator comprises markings indicating volume presented by said outer surface of said container.

24. A fluid dispensing device as claimed in claim 18 wherein said fluid dispensing device further comprises a sheet of material defining a splash guard, and said fluid dispensing device further includes mounting means disposed adjacent to said outlet; wherein said mounting means presents means for mounting said sheet of material to said container whereby said sheet projects from said container; and wherein said mounting means and sheet of material present means for preventing splashing of said fluid in a direction opposite to direction of water dispensed from said outlet; and wherein said sheet of material of said splash guard has a concave exterior surface at said outlet.

25. A fluid dispensing device as claimed in claim 18, wherein said curved nozzle is flared.

26. A fluid dispensing device as claimed in claim 19, wherein said curved nozzle comprises a straight edge.

27. A method for dispensing fluid onto an overhead plant, which comprises the following steps:
   (a) introducing fluid into a fluid dispensing device having a container with opposed first and second ends, by slidably moving a plunger within said container towards said first end, and wherein said plunger is slidably mounted within said container said container further comprises an outlet and curved nozzle adjacent to said outlet adapted to dispense said fluid to produce a flow of said fluid onto said overhead plant; and
   (b) dispensing said fluid to produce a flow of said fluid onto said overhead plant by pointing said curved nozzle toward said overhead plant and moving said plunger toward said second end and dispensing said fluid to said outlet with said curved nozzle guiding said fluid from said outlet to said overhead plants.

* * * * *